Patented Feb. 26, 1952

2,586,850

UNITED STATES PATENT OFFICE 2,586,850

2-ISOPROPYLMETHYLAMINOPROPYL ESTER OF PHENYLCYCLOHEXENYLACETIC ACID AND SALTS THEREOF

Robert Bruce Moffett, Kalamazoo, Mich., assignor to The Upjohn Company, Kalamazoo, Mich., a corporation of Michigan No Drawing. Application May 18, 1950, Serial No. 162,810

3 Claims. (Cl. 260—472)

This invention relates to new compositions of matter which are of value as therapeutic agents, particularly as antispasmodics. More specifically the products of this invention are members of the group consisting of a compound represented by the formula:

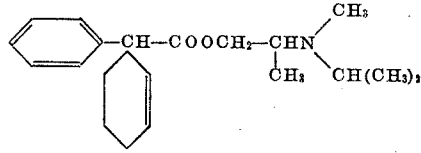

and acid addition salts thereof.

The free basic ester is an almost colorless, viscous liquid which boils at 129 degrees centigrade at a pressure of 0.02 mm. of mercury. It is readily soluble in the common organic solvents, but is insoluble in water. With acids it reacts to form acid addition salts, some being solid crystalline compounds, which are soluble in water. Among the acids suitable for this purpose are inorganic acids such as the hydrogen halides, sulfuric and phosphoric, and organic acids such as acetic, benzoic, citric, tartaric and succinic. Because of the water solubility of the salts it is more convenient to use them instead of the free base. The compounds of this invention are neurotropic antispasmodic agents of high order of activity, that is, they act upon non-striated muscle tissues to relieve spasm induced by the autonomic nervous system and in this respect their action resembles that of atropine.

The 2-isopropylmethylaminopropyl phenyl-delta-2-cyclohexenylacetate of this invention can be prepared by condensing the acid chloride of phenyl-delta-2-cyclohexenylacetic acid with 2-isopropylmethylaminopropanol or by condensing a suitable salt of the acid with a halide of 2-isopropylmethylaminopropanol in a suitable solvent such as benzene, isopropanol, or isopropyl ether. Other methods which are known for the preparation of esters can also be employed. The product can be isolated as a free basic ester or it can be converted to a water-soluble acid addition salt, which is more convenient to use, by treatment with an appropriate acid.

*Preparation.—2-isopropylmethylaminopropanol*

To 512 grams of 90% formic acid (10 moles) was added slowly with cooling 234 grams (2 moles) of 2-isopropylaminopropanol (boiling at 71 degrees centigrade at a pressure of 15 mm. of mercury and prepared in 85% yield by the reductive alkylation of 2-aminopropanol with acetone according to the procedure described by Hancock and Cope, Org. Syntheses, 26, 38 (1946) for 2-isopropylaminoethanol) followed by 325 ml. of 37% aqueous formaldehyde. The mixture was heated until carbon dioxide was evolved rapidly and then the source of heat was removed. When the evolution had subsided, the reaction mixture was heated to about 80-90 degrees centigrade for six to eight hours, treated with 1000 ml. of about 4 N hydrochloric acid and concentrated under reduced pressure. To the viscous residue was added 650 ml. of water and 500 ml. of about 18 N sodium hydroxide, the organic layer separated, and the aqueous layer extracted with four 100 ml. portions of benzene. The organic layer and the extracts of the aqueous layer were combined, dried over anhydrous potassium carbonate and the benzene was removed by distillation under slightly reduced pressure. Distillation of the residue under reduced pressure gave 173 grams (66%) of 2-isopropylmethylaminopropanol boiling at 74 degrees centigrade at a pressure of 21 mm. of mercury; refractive index, $n_D^{25}=1.4375$.

*Analysis.*—Calcd. for $C_7H_{17}NO$: N, 10.68. Found: N, 10.71.

*Example.—2-isopropylmethylaminopropyl phenyl-delta-2-cyclohexenylacetate*

To a solution of 11.8 grams (0.05 mole) of phenyl-delta-2-cyclohexenylacetyl chloride [Kolloff, Hunter, Woodruff and Moffett, J. Am. Chem. Soc., 71, 3988 (1949)] in 10 ml. of dry benzene was added a solution of 7.9 grams (0.06 mole) of 2-isopropylmethylaminopropanol in 15 ml. of dry benzene and the mixture was heated under reflux for three hours. After cooling, ice water containing a small amount of hydrochloric acid was added, the benzene layer separated, and the aqueous layer extracted twice with ether. The extracts were combined, washed twice with water, saturated sodium chloride solution, and dried over anhydrous sodium sulfate. After removal of the ether, distillation of the residual oil under reduced pressure gave 12.9 grams (78%) of 2-isopropylmethylaminopropyl phenyl-delta-2-cyclohexenylacetate as a nearly colorless liquid distilling at 129 degrees centigrade at a pressure of 0.02 mm. of mercury; refractive index, $n_D^{25}=1.5131$.

*Analysis.*—Calcd. for $C_{21}H_{31}NO_2$: N, 4.25. Found: N, 4.17.

To a solution of 12.3 grams of the above free base in 50 ml. of ethyl acetate was added a solution of 7.7 grams of citric acid in 10 ml. of absolute ethanol. Absolute ether was added to the point of turbidity and on long standing crystals of the citrate separated from solution. Further periodic additions of absolute ether resulted in the separation of a total of 13.9 grams of 2-isopropyl-methylaminopropyl phenyl-delta-2-cyclohexenylacetate citrate melting at 85-95 degrees centigrade.

Analysis.—Calcd. for C27H39NO9: N, 2.69. Found: N, 2.84.

By adding an aqueous solution of the stoichiometric amount of an acid such as hydrochloric, hydrobromic, sulfuric and phosphoric to a suspension of the base in water the corresponding salt is obtained. By adding an alcoholic solution of the stoichiometric amount of an acid such as acetic, benzoic, tartaric and succinic to an ethyl acetate solution of the base the salts of the base with these acids are obtained.

Although the foregoing specification comprises preferred embodiments of the invention, it is to be understood that the invention is not limited to the exact details shown and described, and that variations and modifications may be made without departing from the scope of the invention as defined in the appended claims.

I claim:
1. A member of the group consisting of a compound having the formula:

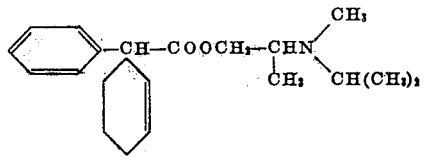

and acid addition salts thereof.

2. 2 - isopropylmethylaminopropyl phenyl-delta-2-cyclohexenylacetate.

3. 2 - isopropylmethylaminopropyl phenyl-delta-2-cyclohexenylacetate citrate.

ROBERT BRUCE MOFFETT.

REFERENCES CITED

The following references are of record in the file of this patent:

Meier et al.: Helv. Medica Acta, 7, 111 (1940-1941).